United States Patent Office 3,338,371
Patented Aug. 29, 1967

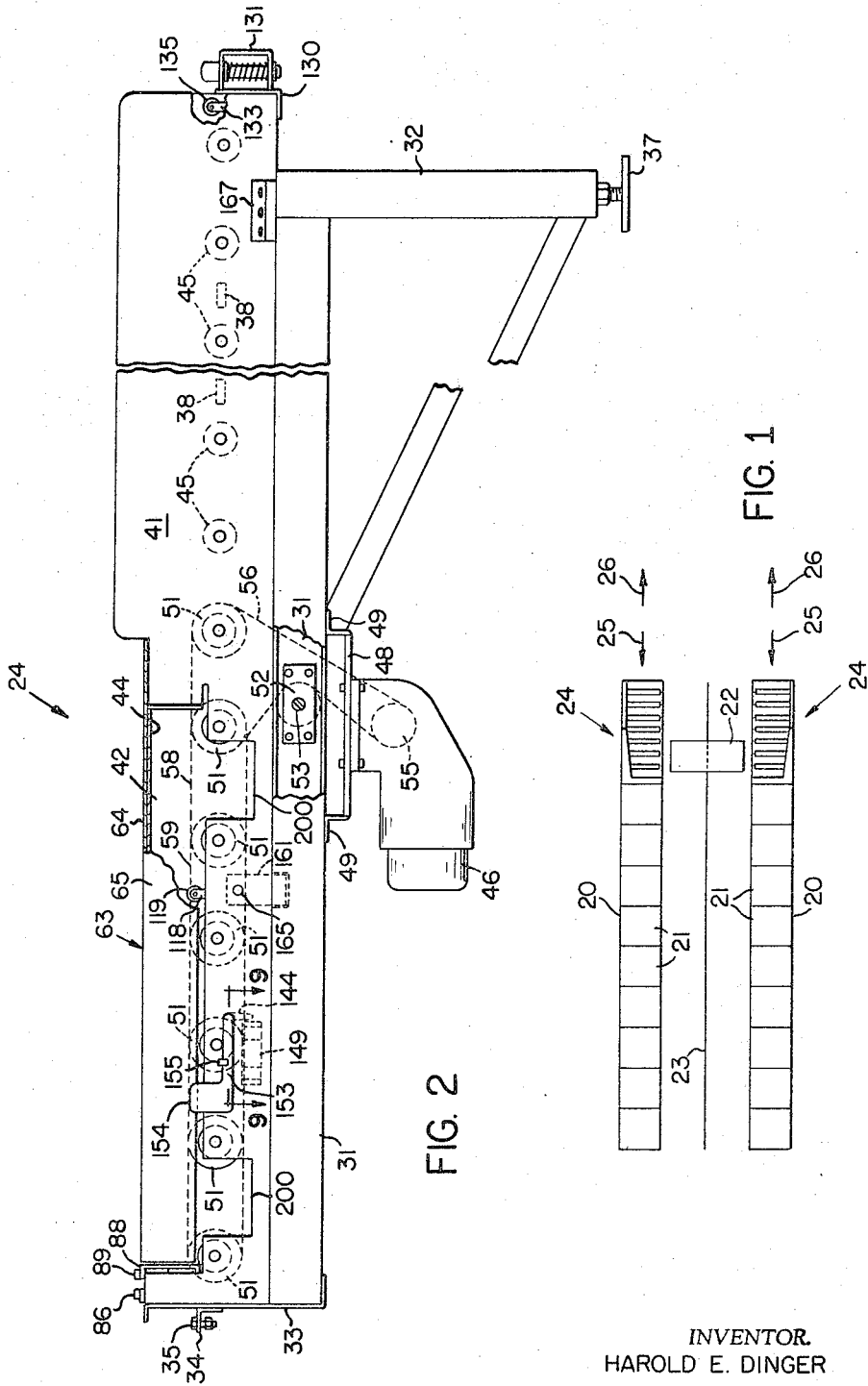

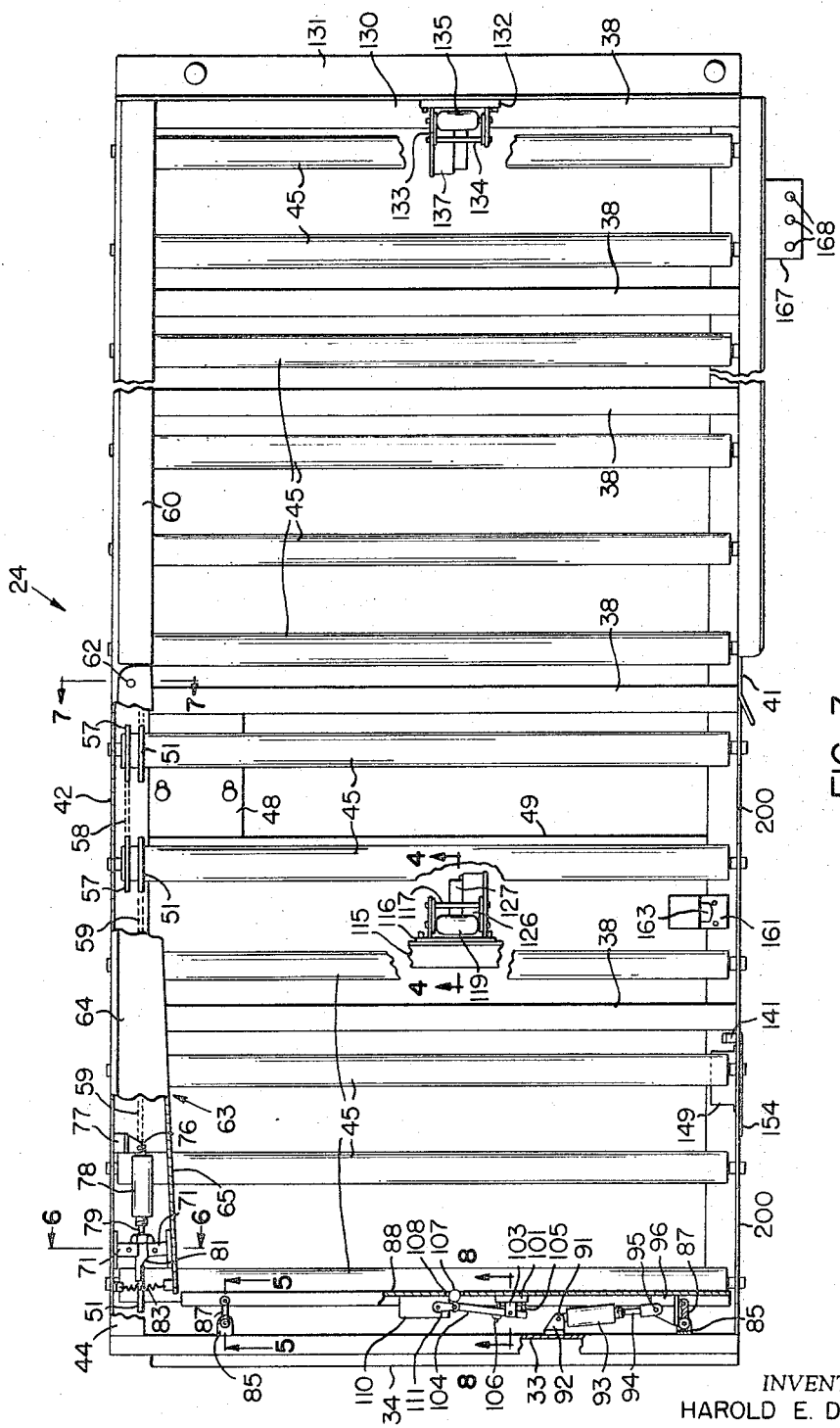

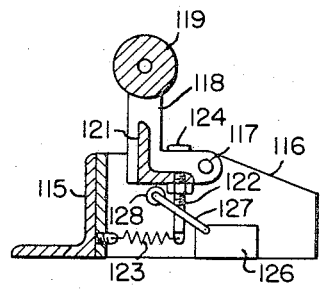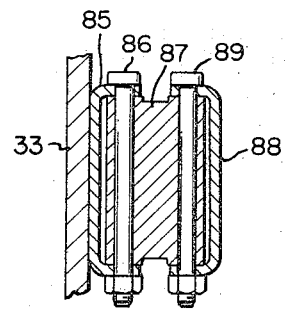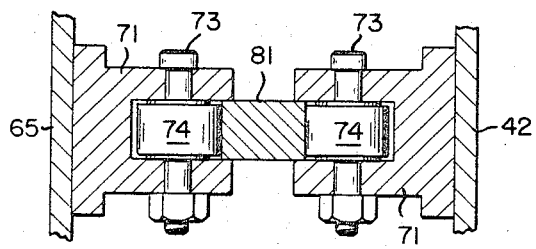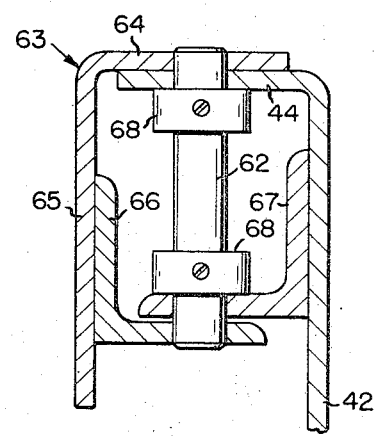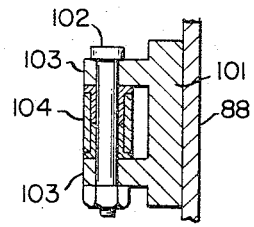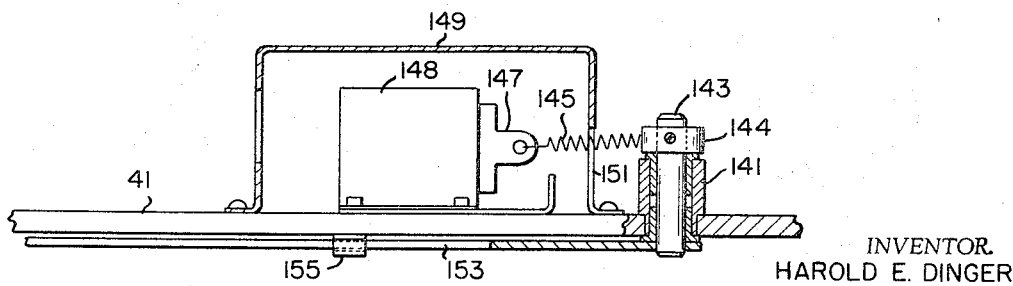

3,338,371
ARTICLE HANDLING APPARATUS
Harold E. Dinger, Brookville, Pa., assignor to Hartman Metal Fabricators, Inc., Waterloo, N.Y., a corporation of New York
Filed Mar. 11, 1966, Ser. No. 533,632
13 Claims. (Cl. 198—29)

This invention relates to article handling apparatus, and are particularly to apparatus for handling pallets which are to be transferred to automated stackers for storage on racks.

Automated stackers are used where it is desired to effect automatically transfer of articles between a loading station and the bays or bins of a storage rack. The stacker usually comprises a carriage which travels horizontally, and an elevator, which is movable vertically.

Most frequently pallets are used for supporting the articles to be transferred. The pallets may be fed by a conveyor to the loading station, from which they are transferred to the stacker.

For completely automated transfer operations, it is essential that the pallets be positioned at the loading station, so that they will be properly positioned when picked up by the stacker, so that, upon being delivered to a preselected bay or bin of the storage rack, they will register properly with the bay or bin.

An object of this invention is to provide apparatus which will obviate misalignment of a pallet during the transfer thereof to or from a stacker of the type above-described.

Another object of this invention is to provide reversible conveyor apparatus for selectively feeding pallets into or out of a predetermined position at a combination loading and unloading station.

A further object of this invention is to provide electrically controlled apparatus for automatically feeding pallets onto a combination loading and unloading station in coordination with the movements of the associated stacker.

A more specific object of this invention is to provide reversible conveyor apparatus for positively orienting or "squaring" a pallet at a combination loading and unloading station, so that the pallet will be disposed in proper registry with a stacker for pick-up thereby.

Other objects of the invention will be apparent hereinafter from the specification and from the recital of the appended claims, particularly when read in conjunction with the accompanying drawings.

In the drawings:

FIG. 1 is a schematic plan view of part of an automatic stacker system with which this invention may be employed;

FIG. 2 is a fragmentary side elevational view of one of the combination load-unload stations in this system, and illustrating, with parts thereof broken away and shown in section, pallet supporting and squaring apparatus made in accordance with one embodiment of this invention;

FIG. 3 is a fragmentary plan view of this apparatus, parts thereof being broken away and shown in section;

FIG. 4 is an enlarged, fragmentary sectional view taken along the line 4—4 in FIG. 3 and looking in the direction of the arrows;

FIG. 5 is an enlarged, fragmentary sectional view taken along the line 5—5 in FIG. 3 looking in the direction of the arrows;

FIG. 6 is an enlarged, fragmentary sectional view taken along the line 6—6 in FIG. 3 looking in the direction of the arrows;

FIG. 7 is an enlarged, fragmentary sectional view taken along the line 7—7 in FIG. 3 looking in the direction of the arrows;

FIG. 8 is an enlarged, fragmentary sectional view taken along the line 8—8 in FIG. 3 looking in the direction of the arrows;

FIG. 9 is an enlarged, fragmentary sectional view taken along the line 9—9 in FIG. 3.

Figure 10:
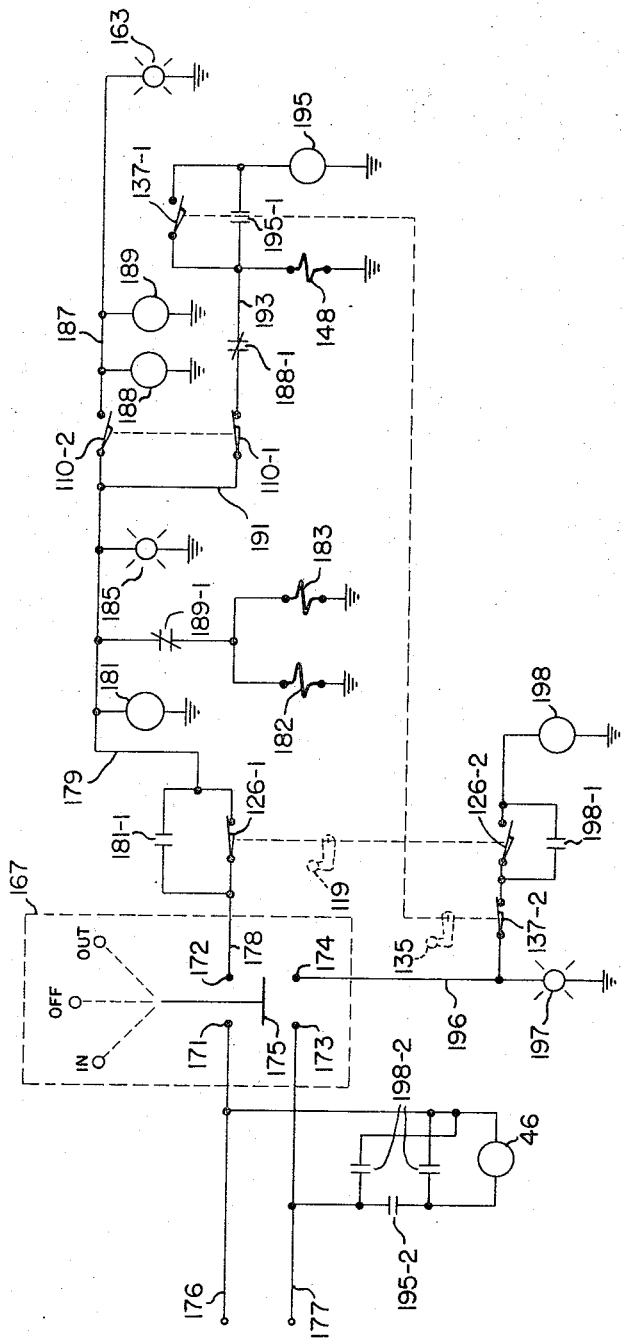
FIG. 10 is a wiring diagram illustrating one type of control circuit for this apparatus.

Referring now to the drawings by numerals or reference, FIG. 1 illustrates schemactially part of a stacker system comprising a pair of storage racks 20 disposed at opposite sides of an aisle along which an automated stacker 22 moves horizontally along a track 23. Each rack 20 may consist of a plurality of bins 21 extending horizontally and also vertically along the aisle; and the stacker may consist of a carriage movable horizontally along the aisle, an elevator which is movable vertically on the carriage and a fork-mechanism on the elevator for moving a pallet into or out of a selected bin of a rack, when the fork-mechanism is positioned by movement of the carriage and of the elevator in registry with the selected bin.

Mounted at one end of each storage rack 20 is a combination load-unload station 24 made in accordance with one embodiment of this invention. Pallets are loaded from these stations onto the stacker 22 for delivery to bins of the racks, and are unloaded from the stacker at these stations, after the pallets have been picked up from bins, to be carried away for use of the articles carried by the pallets. Pallets are delivered onto the outer ends of both loading stations, and are conveyed inwardly in the direction indicated by arrows 25 to register with opposite sides of the stacker 22, when the latter is positioned in its "start" position. The telescopic fork mechanism on the stacker then operates to lift a pallet from one of the loading stations 24 onto the stacker. Thereafter the stacker is automatically dispatched a predetermined distance along the track 23; and its elevator section is moved a predetermined distance vertically until the pallet carried thereby registers with a predetermined bin or bay in one of the storage racks 20. Then the pallet is discharged from the stacker 22 into the registering bay; and the stacker then returns to the "start" position illustrated in FIG. 1. For an unloading operation, after being picked up by the stacker from one of the racks, a pallet is brought to one of the load-unload stations 24 by the stacker, and is discharged from the station in the direction of the arrows 26.

Each station 24 (FIGS. 2 and 3) comprises a pair of spaced, parallel side rails or channel irons 31, which are secured at their forward ends to the upper ends of a pair of vertical legs 32 (only one of which is illustrated in FIG. 2), and at their rear ends to the flanged lower edge of a plate 33. Plate 33 projects above the rear ends of the side rails 31 and carries on its outer face an angle iron 34, by which the station 24 is secured through bolts 35 to one of the storage racks 21. The legs 32, which support the outer or forward end (the right ends in FIGS. 2 and 3) of each station 24, are reinforced in conventional manner by braces, and in their lower ends carry adjustable feet 37 for raising or lowering the outer end of a station.

Mounted on the side rails 31, and projecting slightly beyond the forward ends thereof, are confronting parallel plates 41 and 42 that are connected to one another by struts 38 (FIG. 3). The lower edges of these plates have flanges 43 (FIG. 7) that are welded or otherwise secured to the upper faces of the associated rails 31. The upper edge of plate 42 has a flange 44 that extends the length of this plate.

Rotatably mounted at opposite ends in the plates 41 and 42 to rotate about spaced, parallel axes, which lie in a plane disposed slightly above the horizontal upper surface of the side rails 31, are a plurality (twelve in the embodiment illustrated) of rollers 45. The seven of these rollers at the left in FIGS. 2 and 3 are driven by a reversible motor 46 (FIG. 2), which is removably secured to a stationary plate 48 suspended beneath the side rails 31 by a pair of angle irons 49. To this end, each of these seven rollers 45 has secured adjacent one end thereof a sprocket wheel 51. The sixth and seventh from the left of these rollers 45 are driven from the motor 46 through a chain 56 which passes over the two sprockets 51 of these two rollers, over an idler sprocket 52, and over the drive sprocket 55 of a conventional reduction unit connected with motor 46. Idler sprocket 52 (FIG. 2) is mounted to rotate on a shaft 53, which projects from the inside face of one of the rails 31.

The fifth and sixth from the left of these seven rollers carry additional sprocket wheels 57 (FIG. 3), which are connected to one another by a chain 58. The sprocket 51 on the fifth roller from the left is connected by a further chain 59 with the sprockets 51 on each of the first four rollers 45. The seven leftmost rollers 45 are thus adapted to be driven positively, and in unison from motor 46. The remaining rollers 45 are, however, idlers, free to rotate relative to one another.

Mounted to overlie the forward half of upper flange 44 of plate 42 is an angle iron 60, one leg of which is secured to the top of this flange 44 and the other leg of which projects downwardly toward rollers 45 to help guide pallets as will be described in more detail below.

Mounted to overlie substantially the rear half of the upper flange of plate 42 is a pivotal pallet guide or "squaring" plate 63 (FIGS. 2, 3 and 7). In cross section plate 63 has an inverted, generally L-shaped configuration, and comprises a generally horizontally disposed portion 64 and a downwardly depending guide portion 65, the lower edge of which is spaced slightly above the positively driven conveyor rollers 45. Plate 63 is pivoted at its forward end by a pin 62 for limited swinging movement about a vertical axis toward and away from the plate 42. Pin 62 projects through registering openings in the upper flange of plate 42 and the horizontally disposed portion 64 of pallet guide 63, and at its lower end (FIG. 7) through registering openings in the overlapping legs of angle irons 66 and 67, which are secured to the confronting faces of plates 63 and 42 respectively. Collars 68 secured to pin 62 by set-screws hold the pin against axial movement.

Projecting from the confronting faces of plate 42 and pallet guide 63 near the rear end of each station 24 are two bifurcated brackets 71 (FIGS. 3 and 6). Mounted by a pin 73 to rotate about a vertical axis between the furcations in each bracket 71 is a roller 74.

Pivotally connected at its forward end by a pin 76 (FIG. 3) to a further bracket 77, which projects from the inside face of plate 42 forwardly of the brackets 71, is a cylinder 78, in which there reciprocates a piston that carries a piston rod 79. The outer end of this rod carries a cam 81, that projects between the rollers 74. Intermediate its ends the cam 81 has an inclined camming surface (FIG. 3), which, when the piston rod 79 is shifted to its outermost position (FIG. 3), forces the rollers 74 apart against the resistance of a tension spring 83 (FIG. 3), which connects the rear end of the pallet guide to the plate 42.

Secured to the inside of plate 33 of each station adjacent each end of the plate to project forwardly is a U-shaped bracket 85 (FIGS. 3 and 5). Mounted on each bracket by a pin 86 to pivot about a vertical axis is an arm 87. Pivotally supported on the arms 87 by bolts 89 is an elongate channel member 88.

Pivotally connected at one end thereof by a pin 91 (FIG. 3) to a bracket 92, which projects from the inside face of the associated plate 33 is a cylinder 93. A piston (not shown) is reciprocable in the cylinder 93; and to this is connected a piston rod 94 which is pivotally connected at its outer end by a pin 95 to a bracket 96, which is secured to member 88 adjacent one end thereof, so that upon movement of the rod 94 the member 88 will be swung about the axes of the pins 86.

Secured to the rear face (FIG. 3) of member 88 adjacent the center thereof is a block 101. Pivoted intermediate its ends on a pin 102 (FIG. 8), which is carried by a pair of lugs 103 that project from the face of block 101, is a switch actuating arm 104. A spring 105 interposed between the block 101 and one end of arm 104 urges the latter clockwise (FIG. 3) about pin 102. A secrew 106 carried by the arm 104 intermediate its ends, limits this movement. At its opposite end arm 104 carries a roller 107, which projects part way through an opening 108 formed in the member 88 medially of its ends, when the arm 104 is in its extreme clockwise position.

Also secured to the rear face of member 88 is a two-position switch 110 (FIG. 3) having a pivoted, spring-loaded switch actuating arm 111 the free end of which engages the roller 107.

Secured to the front face of an angle iron 115 (FIGS. 3 and 4), which extends between the side rails 31 beneath and adjacent to the fourth from the left conveyor roller 45 is a U-shaped bracket 116. Mounted at one end to pivot about a pin 117, which extends between the legs of the bracket 116 parallel to the conveyor rollers 45, are two, spaced, L-shaped arms 118. Journaled between these arms 118 to rotate about an axis parallel to the rollers 45 is a roller 119. Depending downwardly from an angle iron 121, which connects together the two arms 118, is a stud 122. At its lower end the stud 122 is connected by a tension spring 123 to the bracket 116, thereby constantly to urge the arms 118 in a clockwise direction (FIG. 4) about the pin 117, and into engagement with a stop lug 124, which projects from one of the legs of the bracket 116.

When the arms 118 are in there extreme clockwise positions as shown in FIGS. 2 and 4, the roller 119 projects slightly above a plane containing the upper peripheral surfaces of the rollers 45. A two-position switch 126 (FIG. 3) carried by bracket 116 has a pivotable switch actuating arm 127, the free end of which carries a roller follower 128 (FIG. 4) that engages the under side of the angle iron 121 for pivotal movement thereby.

Mounted on the inside face of a bracket 130 (FIGS. 2 and 3), which is adjacent the front end of the station, and which supports a guard or channel member 131 that extends across the forward ends of the side rails 31, is a bracket 132, similar to bracket 116. Rotatably supported between the upper ends of a pair of L-shaped arm 133, which are mounted to pivot about a pin 134 carried by the legs of bracket 132, is roller 135, which is similar to roller 119. As in the case of roller 119, a spring (not illustrated) connects the arms 133 to the bracket 132 in such manner as to urge the roller 135 into a first limit position in which it projects slightly above the plane containing the upper surfaces of the rollers 45, as illustrated in FIG. 2. Also, as in the case of the roller 119, the bracket 132 carries a two-position switch 137 having a pivotal switch actuating arm, which is adapted to be pivoted by the arms 133, in a manner similar to that in which the arm 127 responds to the movement of the arms 118.

Rotatably journaled in a sleeve 141 (FIGS. 3 and 9), which is secured at one end in an opening in the plate 41 beneath and adjacent to the third conveyor roller 45 from the rear end of each station 24, and rotatable about an axis which extends parallel to the conveyor rollers, is a pivot pin 143. At its inner end, pin 143 carries downwardly depending arm 144 (FIG. 2), the lower end of which is connected by a tension spring 145 (FIG. 9) to the armature 147 of a solenoid 148. Solenoid 148 is bolted or otherwise secured to the inside face of the plate 41 adjacent the sleeve 141, and is enclosed within a housing 149, which has an opening 151 in one end thereof for accommodating spring 145. Secured at one end thereof to the outer end of pin 143 for pivotal movement thereby is an elongate arm 153. At its free end arm 153 has an enlarged head or flag portion 154 (FIG. 2), which projects above the plate 41 when arm 153 is disposed at its extreme clockwise position about the pin 143 as illustrated in FIG. 3. A metal tab 155 is secured to the outer face of plate 41 to overlie arm 153 intermediate end ends thereof, thereby to limit its clockwise movement about the pin 143.

Mounted on a bracket 161 (FIGS. 2 and 3), which is secured to the upper face of the side rail 31 adjacent plate 41, is a lamp 163. Lamp 163 registers with the space between the fourth and fifth conveyor rollers 45 from the left of the station 24, and is viewable through a hole 165 (FIG. 2) formed in the plate 41.

Secured to plate 41, and projecting outwardly therefrom adjacent the front end of each station 24 is an manually operable, three position pushbutton switch 167 (FIGS. 2, 3 and 10) whose three pushbuttons 168 are respectively, IN, OFF and OUT buttons.

One way in which the apparatus may be wired to effect its purpose is shown diagrammatically in FIG. 10. Here switch 167 is illustrated as comprising four terminals 171, 172, 173 and 174, and a movable contact 175, which is illustrated in the position which it assumes, when the OFF pushbutton of the switch is depressed. Switch 126, which is operated by roller 119, is a two-position switch having a normally closed contact 126–1, and a normally open contact 126–2. Switch 137, which is operated by roller 135, comprises a normally open contact 137–1 and a normally closed contact 137–2. The switch 110, which is operated by the head 107, comprises a normally closed contact 110–1 and a normally open contact 110–2.

Power of, for example, 115 volts A.C. is supplied from a suitable power source, which is connected by the lines 176 and 177 to the terminals 171 and 173, of switch 167. Terminal 172 is connected through line 178, normally-closed contact 126–1, line 179 and a holding relay 181 to ground. When energized, relay 181 closes the normally-open contacts 181–1, which are connected in parallel with the normally-closed contacts 126–1. Two solenoids 182 and 183, which operate, for example, conventional, spring-return servo-valves (not illustrated) that supply hydraulic fluid to the cylinders 78 and 93, respectively, are connected at one side through a normally-closed, time-delay closing switch 189–1 to the line 179, and at their opposite sides to ground. A warning light 185 is also connected at one side to line 179 and at its opposite side to ground.

Line 179 is also connected through normally-open switch contacts 110–2 with a line 187. Each of two relays 188 and 189 is connected at one side to line 187 and at its opposite side to ground. The lamp 163 is also connected at one side to line 187 and at its opposite side to ground.

Line 179 is also connected through line 191, the normally-closed contact 110–1 and a normally-closed, time-delay closing switch 188–1, line 193, through the solenoid 148 to ground, and through the normally-open switch contact 137–1 and a relay 195 to ground. When energized, the relay 195 closes normally-open relay contact 195–1, which is connected in parallel across the normally-open contact 137–1, and closes the normally open contact 195–2, which is in the motor circuit.

Terminal 174 of switch 167 is connected through line 196 and warning light 197 to ground. Line 196 is also connected through normally-closed contact 137–2, normally-open contact 126–2 and a relay 198 to ground. When energized, the relay 198 closes normally-open switch contact 198–1, which is connected in parallel across the normally-open switch contact 126–2, and closes contacts 198–2, which are in the motor circuit.

Each station 24 is adapted to handle conventional rectangular shaped pallets. The distance between the confronting pallet guiding surfaces of members 41 and 60 at the forward end of each station is slightly greater than the width of a pallet; and the length of a pallet is slightly greater than the distance between the rollers 119 and 135.

In operation, assuming that the conveyor is to feed pallets onto one of the stations 24 in the direction of the arrows 25 for pick-up by the stacker 22, the IN button on the switch 167 is depressed, thereby causing the contact 175 to connect switch terminals 171 and 172. Power is thus supplied through line 178 and the normally-closed contact 126–1 to the line 179 to energize relay 181, the green lamp 185, and through the normally-closed switch 189–1 energizes the solenoids 182 and 183. Lamp 185 is mounted at any convenient spot on the station 24 to provide a visual indication that the station 24 has been programmed for delivering pallets into the associated storage rack 20.

Relay 181 closes the normally-open switch contact 181–1; and the solenoids 182 and 183 open the valves (not illustrated) controlling the admission of fluid under pressure to the cylinders 78 and 93, thereby causing the pallet guide 63 to be pivoted counterclockwise about the pin 62 to the position illustrated in FIG. 3, and simultaneously causing member 88 to be swung clockwise about the pins 86 to the position illustrated in FIG. 3.

Also at this time power is supplied through line 191, switch contact 110–1, switch 188–1, and line 193 to the solenoid 148, whereby its armature 147 (FIG. 9) is retracted. This, through spring 145, causes the flag 154 to be pivoted into its extreme upper or clockwise position about the axis of pin 143 (FIG. 2). When the flag is in this upper or raised position, it cooperates with a control member on the stacker 22 to prevent operation of the stacker fork mechanism.

When a pallet is fed onto the outer end of the station 24, with the inner end of the pallet overlying some of the driven conveyor rollers 45, it engages and forces the roller 135 downwardly, thereby closing the contact 137–1 and opening the contact 137–2. Since the contact 126–1 is at this time closed, power flows from line 179 through line 191, switch contact 110–1, switch 188–1, line 193, contact 137–1, and relay 195 to ground. This energizes relay 195 to cause it to close contacts 195–1 and 195–2. Closing of contact 195–2 causes motor 46 to rotate rollers 45 thereby to feed the pallet toward the left in FIGS 1 to 3.

As the pallet advances toward the rear, left end of the station 24, its leading edge engages the pallet guide 63 to be shifted toward the plate 41. Because the pallet guide 63 is inclined slightly to the plates 41 and 42, the leading edge of the advancing pallet may be shifted out of parallel with the bar 88 (FIG. 3), so that one corner of the pallet first engages the upper end in FIG. 3 of the bar 88. However, since the rollers 45 continue to rotate, the entire leading edge of the pallet will be swung into contact with the face of member 88 in readiness for transfer by the stacker 22 to a bay in one of the racks 20. At this time the pallet is in the "squared" position, and will have passed over the roller 119, thereby opening the contact 126–1 and closing the contact 126–2, and will have engaged and pushed the follower 107 toward the left through the opening 108 in bar 88, thereby opening contact 110–1 and closing contact 110–2.

Despite this opening of contact 126–1, power will still be applied to line 179 through the now closed contact 181–1 of the holding relay 181. The opening of the switch contact 110–1, however, will deenergize the solenoid 148 and relay 195, thereby permitting flag 154 to drop counterclockwise about pin 143, and opening the circuit to motor 46 to interrupt the drive to the conveyor rollers 45.

Closing of the switch contact 110–2, which prevails as long as the pallet is seated in a "squared" position on the station 24, causes power to flow from the line 179 to the relays 188 and 189, and to the lamp 163. The energized relays 188 and 189 open the normally-closed switches 188–1 and 189–1. The illuminated lamp 163 provides an additional indication that a pallet is seated in "squared" position on the station 24.

When the switch 189–1 is opened by relay 189, solenoids 182 and 183 are deenergized, thereby allowing the valves (not illustrated), which control the admission of fluid under pressure to the cylinders 78 and 93, to be returned to their closed or exhaust positions. The cylinders 78 and 93 are thus put on exhaust, so that the piston rods 79 and 94, respectively, are retracted. As the rod 79 retracts, it withdraws the inclined camming surface 82 of the cam 81 from between the rollers 74, so that the spring 83 effects a slight clockwise movement of the pallet guide 63 about the pin 62, and away from the position illustrated in FIG. 3. The retraction of piston rod 94 causes the bar 88 to be swung slightly counterclockwise about the pins 86 (FIG. 3), thereby moving bar 88 away from the leading edge of the "squared" pallet, and permitting follower 107 to swing back toward the right (FIG. 2) in opening 108, thus allowing the contacts 110–1 and 110–2 to return to their normally-closed and normally open positions, respectively.

This once again deenergizes relays 188 and 189, and lamp 163, but there is a brief interval of time before the time-delay switches 188–1 and 189–1 return to their normally-closed positions. During this interval of time, therefore, the solenoids 182, 183 and 148, and the relay 195 remain deenergized, even though the contacts 137–1 may be at this time closed by a second pallet, which is disposed on the roller 135 in readiness for movement to the rear, delivery end of the station 24.

Thus the members 63 and 88 are retracted, the conveyor rollers 45 are motionless, and the flag 154 is in its lowered position. At this time a forklift mechanism on the stacker 22 may be inserted beneath the "squared" pallet through a pair of recesses 200 (FIGS. 2 and 3) formed in the plate 41 to draw the pallet onto the elevator section of the stacker. By the time the "squared" pallet has been transferred by the fork mechanism to the stacker 22, the time delay switches 188–1 and 189–1 will have returned to their normally-closed positions, thereby once again to energize the solenoids 182, 183, 148 and relay 195 if there is a second pallet then resting upon the roller 135 at the outer end of the station.

This second, and all subsequent pallets will be advanced rearwardly of the station 24 to be "squared" before being transferred to the stacker 22, in the same manner as the first pallet.

To program the system for transferring a pallet that has been taken from a storage rack 20 to the associated load-unload station 24, the OUT pushbutton of switch 167 at the given station 24 is pushed to shift the contact 175 down into engagement with the switch terminals 173 and 174. This supplies power from terminal 174, through line 196 to the red lamp 197, thereby to provide a visual indication that the station is set for an OUT operation. It will be understood that the stacker 22 withdraws a pallet from a bay in one of the storage racks 20, and then moves to the position illustrated schematically in FIG. 1, at which point its fork mechanism projects through the apertures 200 in the sidewall 41 transversely of one of the stations 24 to deposit the pallet on the rollers 45 at the rear end of the station.

When the pallet is lowered onto the rollers 45 by the fork mechanism, the pallet depresses the roller 119, thereby closing the switch contact 126–2. Since at this time the terminals 171 and 172 are open, the solenoids 182 and 183 are deenergized so that the guides 63 and 88 are in their retracted positions, and will not interfere with the deposit of the pallet onto the rollers 45 by the fork mechanism. Also at this time, there is no pallet positioned on the roller 135 at the outer end of the station, so that the switch contact 137–2 is in its normally-closed position.

Power is therefore supplied from wire 196 through contact 137–2, the now-closed contact 126–2, and relay 198 to ground. Being thus energized, relay 198 closes the normally-open switch contact 198–1, which is in parallel with contact 126–2, and at the same time closes contacts 198–2 to cause motor 46 to be driven in a direction opposite to that in which it is driven, when the motor is energized through the relay contact 195–2. The conveyor rollers 45 of the associated station 24 are therefore rotated to carry the pallet toward the front end of the station.

As the forwardly moving pallet moves off the roller 119, the switch contacts 126–2 return to their normally-open position, but the holding switch 198–1 maintains the relay 198 energized until the leading end of the forwardly moving pallet engages and depresses the roller 135 at the front end of the station. Upon being depressed, roller 135 opens the contacts 137–2, thereby deenergizing the relay 198, which in turn deenergizes the motor 46 and causes the switch 198–1 to return to its normally-open position. If in the meantime a second pallet has been delivered by the stacker 22 to the station 24, the closing of the switch contacts 126–2 by the second pallet will not effect energization of the relay coil 198 until the pallet, which is then seated on the roller 135, is removed from the outer end of the station 24.

From the foregoing it will be apparent that applicant has devised a relatively simple and automatic means for assuring that pallets will be "squared" prior to transfer to a stacker. This "squaring" operation prevents any misalignment of the pallets with the access openings of the bays in the storage racks 20.

By employing a control circuit of the type above-described, the positively driven conveyor rollers 45 in each station 24 are made to rotate only when a pallet is moved onto a station for "squaring" before delivery to one of the storage racks, or, conversely, when a pallet is brought from one of the racks and deposited by the stacker on one of the stations 24 for delivery out of the system. Moreover each station 24 is readily convertible from a loading to an unloading operation merely by pushing a button on the associated switch 167. If most of the pallets are being delivered to the storage racks, both stations 24 may be programmed for IN operation, or vice versa. The flag 154 and the lamp 163 are adapted to cooperate with control means carried by the stacker 22. This control means, although it forms no part of the invention, is adapted to prevent operation of the stacker fork mechanism whenever the flag 154 is in its elevated or extreme clockwise position about the axis of pin 143. A photo electric cell on the stacker control mechanism may be made responsive to illumination of lamp 163, to prevent the stacker fork mechanism from picking up a pallet from one of the stations 24 until the pallet has been "squared" and the associated lamp 163 has been illuminated.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:
1. Apparatus for handling articles, comprising
 (a) a frame,
 (b) a conveyor mounted on said frame for transporting articles between opposite ends of said frame,
 (c) drive means operable to drive said conveyor in one direction, whereby an article supported on said conveyor is advanced by said conveyor from one end of said frame to the other,

(d) means for automatically actuating said drive means, when an article is placed on said conveyor adjacent said one end of said frame, (e) means on said frame adjacent said other end thereof for guiding the article into a predetermined position, (f) means for automatically interrupting the operation of said drive means to stop the movement of said conveyor, when said article is in said predetermined position, (g) said guiding means comprising a first member extending across said other end of said frame and projecting above said conveyor for engagement by said article when said article contacts it, and (h) a second member extending along one side of said frame above said conveyor, (i) said second member being engageable by said article during the advance thereof toward said other end, and being inclined relative to said one side of said frame thereby to effect shifting of said article toward the opposite side of said frame, during the advance of said article.

2. Apparatus for handling articles, comprising (a) a frame, (b) a conveyor mounted on said frame for transporting articles between opposite ends of said frame, (c) drive means operable to drive said conveyor in one direction, whereby an article supported on said conveyor is advanced by said conveyor from one end of said frame to the other, (d) means for automatically actuating said drive means, when an article is placed on said conveyor adjacent said one end of said frame, (e) means on said frame adjacent said other end thereof for guiding the article into a predetermined position, (f) means for automatically interrupting the operation of said drive means to stop the movement of said conveyor, when said article is in said predetermined position, (g) said interrupting means comprising first switch means mounted on said frame adjacent said other end and operable by an article advanced into said predetermined position by said conveyor, (h) said actuating means comprising second switch means mounted on said frame adjacent said one end thereof and operable by an article supported on said conveyor adjacent said one frame end, and (i) third switch means connected to said first and second switch means and operative when an article is positioned on said conveyor adjacent each end of said frame, to delay the activation of said drive means by said second switch means until after the article disposed in said predetermined position has been removed.

3. Apparatus as defined in claim 2, including (a) first circuit means operable, when energized, to effect movement of said conveyor in said one direction, (b) second circuit means operable, when energized, to effect movement of said conveyor in the opposite direction, (c) a manually operable switch movable to a first position to energize said first circuit, and to a second position to energize said second circuit, (d) fourth switch means connected to said second circuit means and mounted on said frame adjacent said other end thereof for operation by an article disposed in said predetermined position to effect the movement of said conveyor in said opposite direction, when said manually operable switch is in said second position, and wherein (e) said second switch means includes means for stopping the movement of said conveyor in said opposite direction upon the movement of an article from said predetermined position to a position adjacent said one frame end.

4. Apparatus for handling articles, comprising (a) a frame, (b) a conveyor mounted on said frame for transporting articles between opposite ends of said frame, (c) drive means operable to drive said conveyor in one direction, whereby an article supported on said conveyor is advanced by said conveyor from one end of said frame to the other, (d) means for automatically actuating said drive means, when an article is placed on said conveyor adjacent said one end of said frame, (e) means on said frame adjacent said other end thereof for guiding the article into a predetermined position, (f) means for automatically interrupting the operation of said drive means to stop the movement of said conveyor, when said article is in said predetermined position, (g) manually operable control means operatively connected to said drive means, and movable selectively to a first position to effect the movement of said conveyor in said one direction during the operation of said drive means, and to a second position to effect the movement of said conveyor in the opposite direction, during the operation of said drive means, and (h) means operative, when said control means is in said second position, for automatically stopping movement of said conveyor in said opposite directon, after an article has been moved thereby from said other end to said one end of said frame.

5. Apparatus for handling articles, comprising (a) a frame, (b) a conveyor mounted on said frame for transporting articles between opposite ends of said frame, (c) drive means operable to drive said conveyor in one direction, whereby an article supported on said conveyor is advanced by said conveyor from one end of said frame to the other, (d) means for automatically actuating said drive means, when an article is placed on said conveyor adjacent said one end of said frame, (e) means on said frame adjacent said other end thereof for guiding the article into a predetermined position, (f) means for automatically interrupting the operation of said drive means to stop the movement of said conveyor, when said article is in said predetermined position, (g) said conveyor comprising a plurality of parallel conveyor rollers extending between opposite sides of said frame for rotation by said drive means, and (h) said guide means comprising a first member mounted on said frame adjacent said other end thereof, and extending parallel to said rollers and into the path along which said article moves during the advance thereof toward said other end, thereby to engage and stop said article in said predetermined position, and a second member mounted along one side of said frame, and slidably engageable by said article during the advance thereof toward said other frame end to effect shifting of said article axially of said rollers.

6. Apparatus as defined in claim 5, wherein (a) said first member has thereon a surface which is complementary to the leading edge of the article conveyed by said rollers toward said other frame end, and (b) said interrupting means comprises first switch means operable by said article to stop said rollers, when said surface and said leading edge are disposed in engagement.

7. Apparatus as defined in claim 5, including
(a) means pivotally mounting said second member adjacent one end thereof to said one side of said frame for limited oscillatory movement about an axis normal to a plane containing the axes of said rollers, and
(b) means connecting said second member adjacent its opposite end to said one side of said frame, and operative to urge said second member selectively into one of its limit positions,
(c) the last-named means including means responsive to the operation of said interrupting means and the stopping of said rollers for swinging said second member from a first limit position in which it projects into said path along which said article is advanced, to a second limit position in which it is withdrawn from said path.

8. Apparatus as defined in claim 5, including
(a) control means for said drive means operable to reverse the rotation of said rollers, thereby to convey an article from said other end of said frame toward said one end thereof, and
(b) second switch means operable by said article, after movement thereof to a predetermined position adjacent said one end of said frame, automatically to stop the rotation of said rollers.

9. Apparatus for handling articles, comprising
(a) a frame,
(b) a conveyor mounted on said frame for transporting articles between opposite ends of said frame,
(c) drive means operable to drive said conveyor in one direction, whereby an article supported on said conveyor is advanced by said conveyor from one end of said frame to the other,
(d) means for automatically actuating said drive means, when an article is placed on said conveyor adjacent said one end of said frame,
(e) means on said frame adjacent said other end thereof for guiding the article into a predetermined position,
(f) means for automatically interrupting the operation of said drive means to stop the movement of said conveyor, when said article is in said predetermined position,
(g) said actuating means comprising first switch means operable by an article, when the article is placed in a first position on said conveyor adjacent said one end of said frame,
(h) said interrupting means comprising second switch means operable by an article, when the article is in said predetermined position to interrupt said drive means, and
(i) means operative upon the interruption of said drive means to delay the reactuation of said drive means by said first switch means for a predetermined period of time.

10. Apparatus as defined in claim 9 including
(a) reverse drive means for driving said conveyor in the direction opposite to said one direction,
(b) manually operable control means movable from one to another position to connect said reverse drive means to said conveyor,
(c) third switch means for automatically actuating said reverse drive means, when an article is disposed on said conveyor adjacent said other frame end, and said control means is in said other position, and
(d) means responsive to the operation of said first switch means for interrupting said reverse drive means, when an article is in said first position and said control means is in said other position.

11. Apparatus as defined in claim 10, including
(a) means mounting said guide means on said frame for movement between operative and inoperative positions, respectively,
(b) means responsive to the movement of said control means to said one position to shift said guide means to its operative position wherein it is operative to guide an article into said predetermined position during the advance of the article toward said other frame end, and
(c) means operative, when said control means is moved to said other position, to move said guide means to its inoperative position.

12. Apparatus for handling articles, comprising
(a) a frame,
(b) a conveyor mounted on said frame for transporting articles between opposite ends of said frame,
(c) drive means operable to drive said conveyor in one direction, whereby an article supported on said conveyor is advanced by said conveyor from one end of said frame to the other,
(d) means for automatically actuating said drive means, when an article is placed on said conveyor adjacent said one end of said frame,
(e) means on said frame adjacent said other end thereof for guiding the article into a predetermined position,
(f) means for automatically interrupting the operation of said drive means to stop the movement of said conveyor, when said article is in said predetermined position,
(g) means for preventing the operation of said actuating means until the last-named article is removed from said predetermined position, and
(h) means for preselecting the direction in which said conveyor will move upon the operation of said actuating means.

13. Apparatus for handling articles, comprising
(a) a frame,
(b) a conveyor for transporting articles from one end of said frame to the other,
(c) means for automatically starting said conveyor upon deposit of an article thereon,
(d) means positioned along one side of said frame for guiding the article into a predetermined position on said conveyor as the article is transported by the conveyor,
(e) means at said other end of the frame positioned to be contacted by the article when the article is in said predetermined position to stop the conveyor,
(f) said guide means comprising a plate pivotally mounted at said one side of the frame, and having
(g) means operated, when an article is placed on said conveyor at said one end of the frame, to move said guide means to operative position, and
(h) means operated by said stop means, when said stop means is actuated, to retract said guide means from operative position.

References Cited

UNITED STATES PATENTS 3,204,752   9/1965   Conner _____ 198—21

EVON C. BLUNK, *Primary Examiner.*

RICHARD E. AEGERTER, *Examiner.*